INVENTOR.
Cornelius Wiens

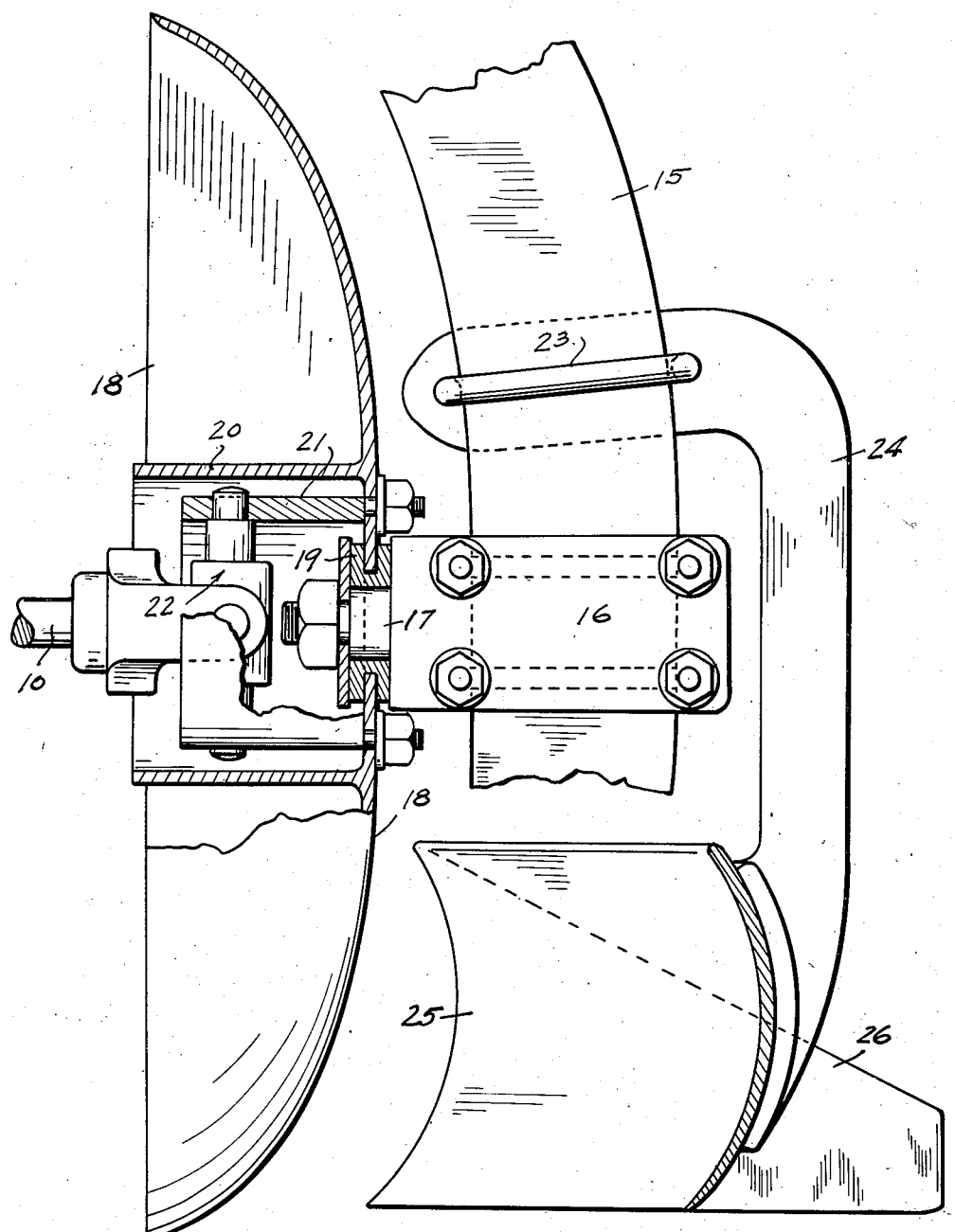

Patented Dec. 2, 1952

2,619,747

UNITED STATES PATENT OFFICE 2,619,747

ROTARY DISK PLOW DITCHING APPARATUS

Cornelius Wiens, Portland, Oreg.

Application March 28, 1947, Serial No. 737,795

1 Claim. (Cl. 37—92)

This invention relates to plowing implements of the rotary-disc type and has for one of its principal objects to provide an implement of this character which will work with uniform efficiency throughout an operable speed range of from approximately 4 to 12 miles per hour and with less resistance than that of rotary-disc plows now common in the art. This is partially due to another feature of the invention in the form of means for rotating the disc or discs at a greater speed than they would normally rotate if rolled along the ground.

Another object is the provision of a scraper blade and strike board formed integral with each other and adjustable vertically rearwardly of the rotary-disc for the purpose of leveling the bottom and smoothing one side of the furrow cut by the rotary-disc.

The foregoing and other objects will appear as my invention is more fully hereinafter described in the following specification, illustrated in the accompanying drawings and finally pointed out in the appended claim.

In the drawings:

Figure 3 is an enlarged fragmentary sectional view through the rotary-disc and the scraper.

Referring now more particularly to the drawings.

Figure 1:
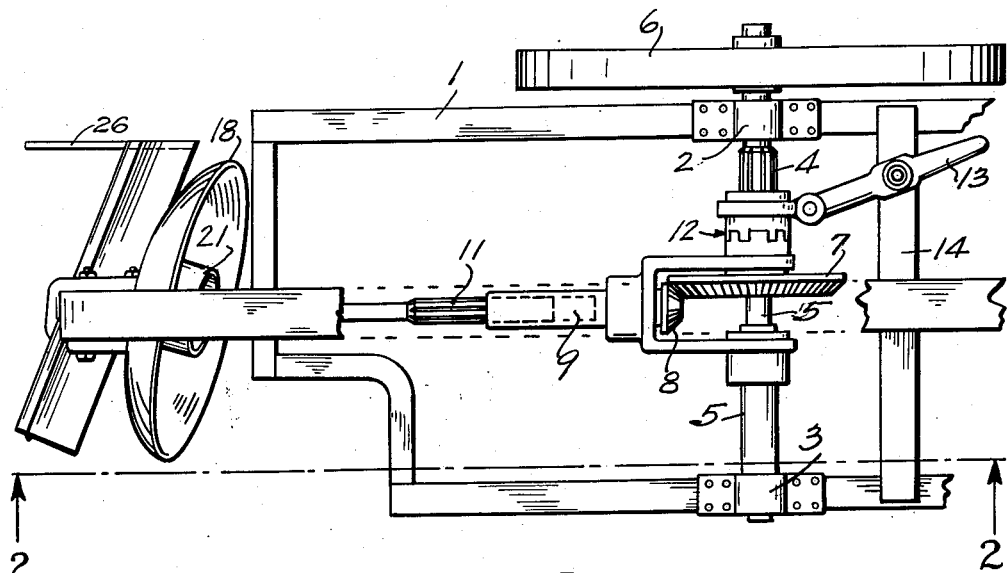
Figure 1 is a top plan view of a plow made in accordance with my invention.
Figure 2:
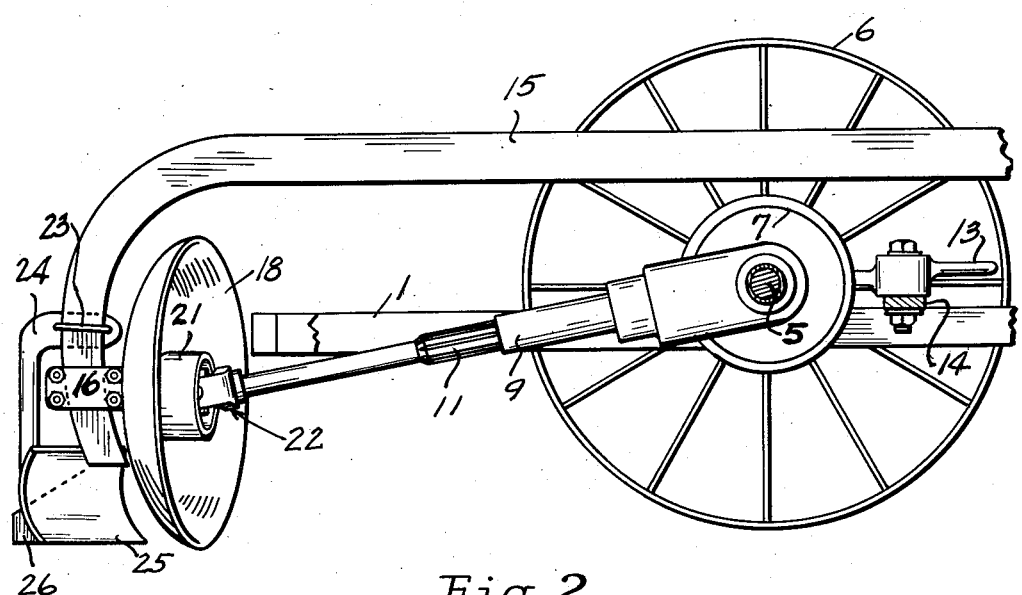
Figure 2 is a sectional side elevation taken along the line 2—2 of Figure 1.

In Figures 1 and 2 reference numeral 1 indicates a frame to whose side members are mounted bearings 2 and 3 to rotatably support a splined shaft 4 and a shaft 5, respectively. To the outer end of the shaft 4 is secured a driving wheel 6 for rotating a bevel gear 7 secured to the shaft 5 and meshing with a companion gear 8 secured to one end of a hollow and internally splined driven shaft 9. Slidably engaged with the shaft 9 is a shaft 10 externally splined as at 11.

For selectively rotating shaft 10 through the gears 7 and 8, I provide a clutch unit generally indicated at 12 and operable by means of a lever 13 mounted to a cross member 14. The clutch unit may be of any conventional type operable along the splined shaft 4.

Superimposed upon the frame 1 is a plow beam 15 turned downwardly at its outermost end as shown, and to this end portion I secure by means of brackets 16 a bearing shaft 17 upon which is rotatably mounted a rotary-disc 18 by means of its hub 19. The center of the disc is formed with concentric cylindrical housings 20 and 21 disposed one within the other.

The outermost end of the shaft 10 is attached to the housing 21 by means of a universal joint generally indicated at 22 for imparting rotation to the disc at a greater speed than it would normally rotate if rolled along the ground at the same rate of travel as the implement. The beam end of the frame as viewed in Figures 1 and 2 is attached to the towing vehicle such as a tractor or the like or to the harness of draft animals.

Also secured to the downwardly turned portion of the beam 15 by means of a U bolt 23 is an arm 24 to whose lowermost end is secured by any suitable means a scraper blade 25 formed integral with a strike board 26 which are adjustable as a unit vertically with respect to the beam by adjusting and setting the U bolt at various positions. The strike board, as best illustrated in Figure 1, is in angular relation to, and trails rearwardly from, the scraper blade in a position parallel to the line of travel of the implement.

In operation, the rotation of the wheel 6 due to the ratio between the gears 7 and 8, the disc 18 is rotated at a relatively greater speed than if it were merely rolled along the ground. This rotation of the disc enables it to operate quicker and to render itself self-cleaning, and by this arrangement the plow works efficiently in all kinds of soil ranging from gravel land to blue clay, gumbo, or the like. The scraper blade and strike board unit trailing the rotary disc may be raised or lowered to level the bottom of the furrow transversely by means of the scraper blade 25 and to smooth one side of the furrow by means of the trailing strike board 26.

While I have shown a particular form of embodiment of my invention, I am aware that many minor changes therein will readily suggest themselves to others skilled in the art without departing from the spirit and scope of the invention. Having thus described the invention, what I claim as new and desire to protect by Letters Patent is:

A plow implement comprising a rectangular frame, two aligned shafts rotatably mounted across said frame, a driving wheel secured to one of said shafts, means carried by one of said shafts for selective engagement with means carried by the other of said shafts for imparting rotation thereto, a gear secured to said other of said shafts for rotation therewith, a driven shaft operatively engaged with said gear and extending rearwardly of said frame, a rotary plow disc attachd to the outermost end of said driven shaft by means of a universal joint, a plow beam secured at one of its ends to one end of said frame and its opposite end terminating rearwardly and below said frame, a spindle adjustably mounted to said opposite end of said beam to form a bearing for said disc, a scraper blade and strike board formed integral with each other and adjustably attached to said opposite end of said beam, and said scraper blade arranged parallel to the diameter of said disc and the strike board being substantially parallel to the line of travel of said implement whereby said scraper blade will level off horizontally the furrow cut by said plow disc and the strike board will smooth off one side of said furrow.

CORNELIUS WIENS.

REFERENCES CITED

The following references are of record in the file of this patent:

UNITED STATES PATENTS

| Number | Name | Date |
|---|---|---|
| 793,715 | Deere | July 4, 1905 |
| 955,179 | Martin | Apr. 19, 1910 |
| 1,019,804 | Kinnick | Mar. 12, 1912 |
| 2,232,298 | Wooley et al. | Feb. 18, 1941 |

FOREIGN PATENTS

| Number | Country | Date |
|---|---|---|
| 540,709 | France | Apr. 21, 1922 |